United States Patent
Cejka et al.

(10) Patent No.: US 11,971,250 B2
(45) Date of Patent: Apr. 30, 2024

(54) SYSTEM AND METHOD FOR OPERATOR GUIDED IDENTIFICATION OF VEHICLE REFERENCE LOCATIONS FOR ADAS SENSOR ALIGNMENT

(71) Applicant: Hunter Engineering Company, Bridgeton, MO (US)

(72) Inventors: Brian M Cejka, Des Peres, MO (US); Daniel R Dorrance, Ballwin, MO (US); Patrick G. Callanan, St. Louis, MO (US); Michael T. Stieff, Epworth, GA (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 338 days.

(21) Appl. No.: 17/434,404

(22) PCT Filed: Mar. 5, 2020

(86) PCT No.: PCT/US2020/021174
§ 371 (c)(1),
(2) Date: Aug. 26, 2021

(87) PCT Pub. No.: WO2020/181077
PCT Pub. Date: Sep. 10, 2020

(65) Prior Publication Data
US 2022/0042794 A1   Feb. 10, 2022

Related U.S. Application Data

(60) Provisional application No. 62/813,905, filed on Mar. 5, 2019.

(51) Int. Cl.
*G01B 21/04* (2006.01)
*G01B 11/275* (2006.01)
(Continued)

(52) U.S. Cl.
CPC ........ *G01B 11/2755* (2013.01); *G01S 7/4086* (2021.05); *G01S 7/497* (2013.01);
(Continued)

(58) Field of Classification Search
CPC ...... G01S 7/4086; G01S 7/497; G01S 13/931; G01B 11/2755; G01B 2210/143; G01B 2210/283
See application file for complete search history.

(56) References Cited

U.S. PATENT DOCUMENTS

| 5,801,834 A | 9/1998 | Danielson et al. |
| 11,385,134 B1 * | 7/2022 | Stieff ............ H04N 9/315 |

(Continued)

FOREIGN PATENT DOCUMENTS

WO    2018067354 A1    4/2018

OTHER PUBLICATIONS

International Search Report for PCT/US2020/021174 mailed Jul. 8, 2020.
Written Opinion for PCT/US2020/021174 mailed Jul. 8, 2020.

*Primary Examiner* — Rebecca C Bryant
(74) *Attorney, Agent, or Firm* — Sandberg Phoenix & von Gontard P.C.

(57) ABSTRACT

A vehicle service system incorporating a pair of gimbal-mounted optical projection systems enables an operator to selectively orient each optical emitter of the optical projection system to illuminate a location on a vehicle surface in proximity to the system. Signals indicative of an orientation of each optical emitter about three-axes of rotation are received at a controller programmed with software instructions to utilize the received signals, together with known locations for the systems, to calculate a three-dimensional coordinate for the illuminated location within an established frame of reference. The controller is further programmed to
(Continued)

utilize the calculated three-dimensional coordinate of the illuminated location as an origin point for determining one or more placement locations within the established frame of reference for ADAS sensor calibration or alignment targets.

8 Claims, 8 Drawing Sheets

(51) Int. Cl.
  *G01S 7/40* (2006.01)
  *G01S 7/497* (2006.01)
  *G01S 13/931* (2020.01)

(52) U.S. Cl.
  CPC .. *G01B 2210/143* (2013.01); *G01B 2210/283* (2013.01); *G01S 13/931* (2013.01)

(56) References Cited

U.S. PATENT DOCUMENTS

| | | | |
|---|---|---|---|
| 11,763,486 B2 * | 9/2023 | Cejka | H04N 23/56 |
| | | | 348/142 |
| 2011/0314684 A1 | 12/2011 | Hayes et al. | |
| 2016/0252619 A1 | 9/2016 | Markendorf et al. | |
| 2018/0100783 A1 | 4/2018 | Stieff et al. | |
| 2023/0243676 A1 * | 8/2023 | Lawrence | H04N 17/002 |
| | | | 73/1.01 |

\* cited by examiner

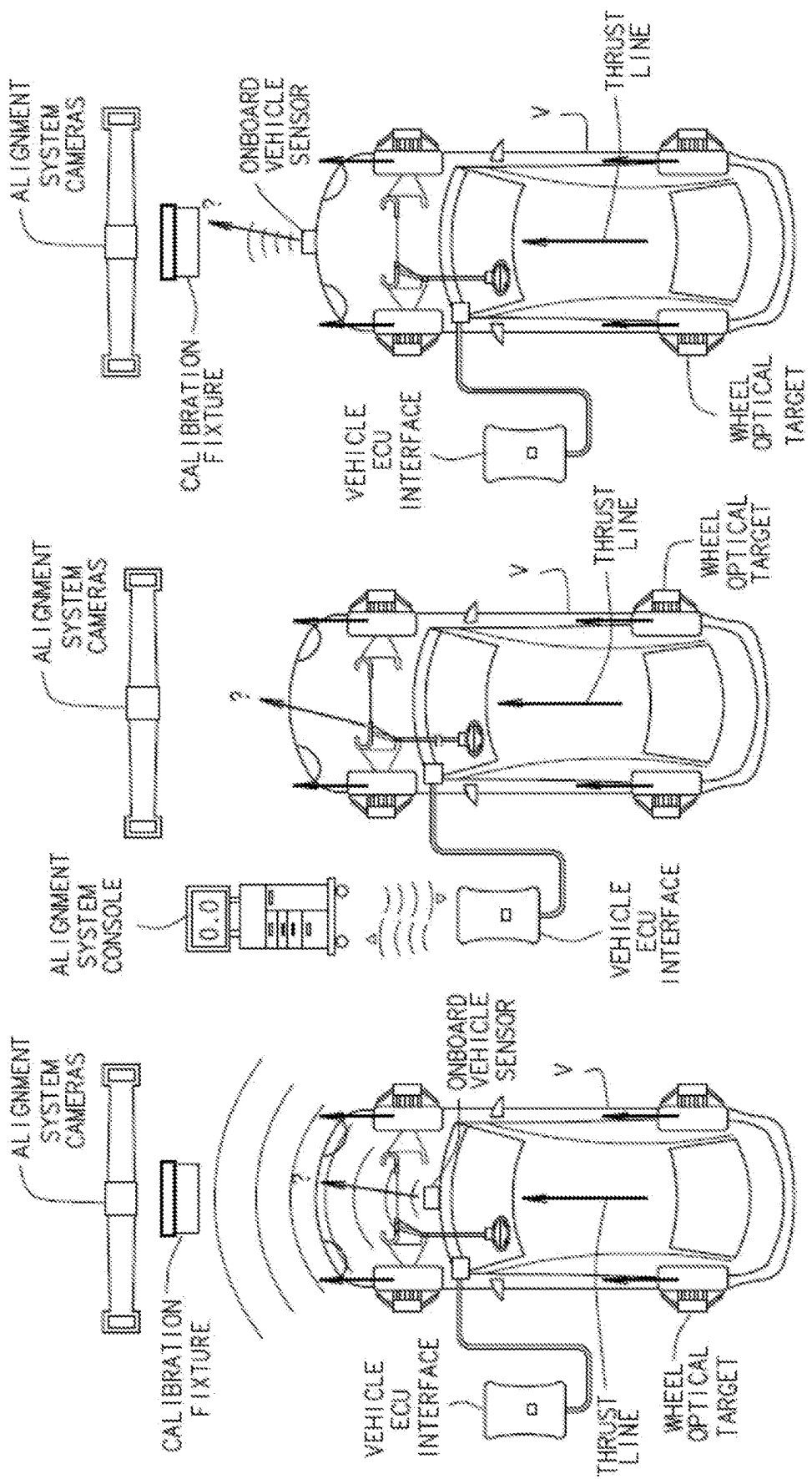

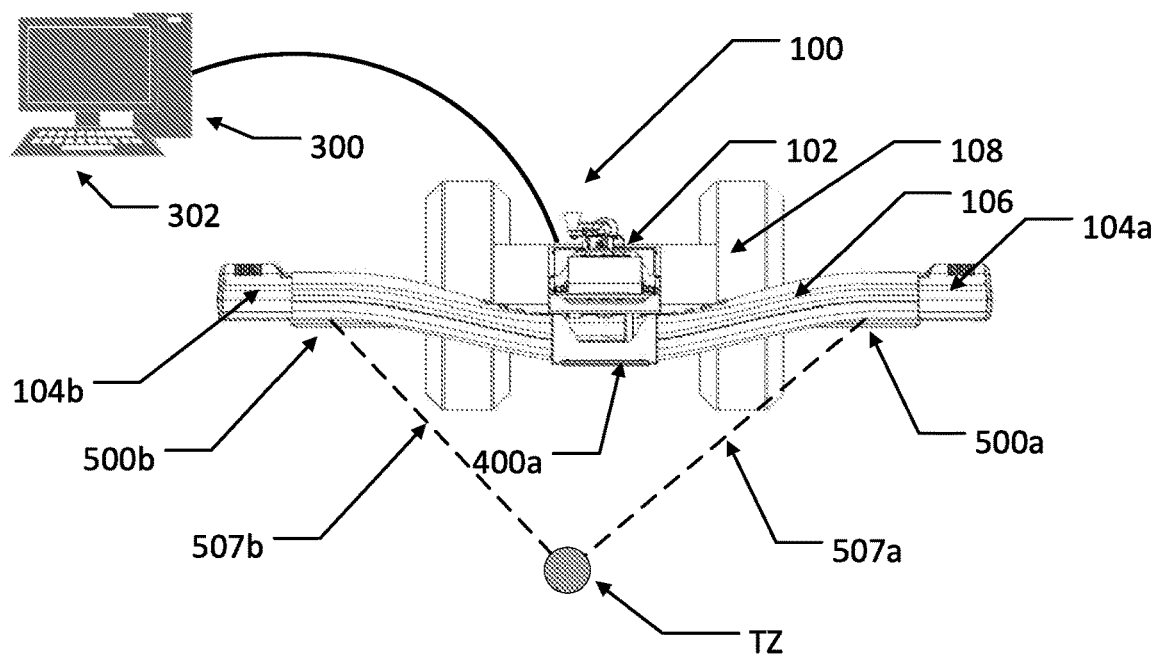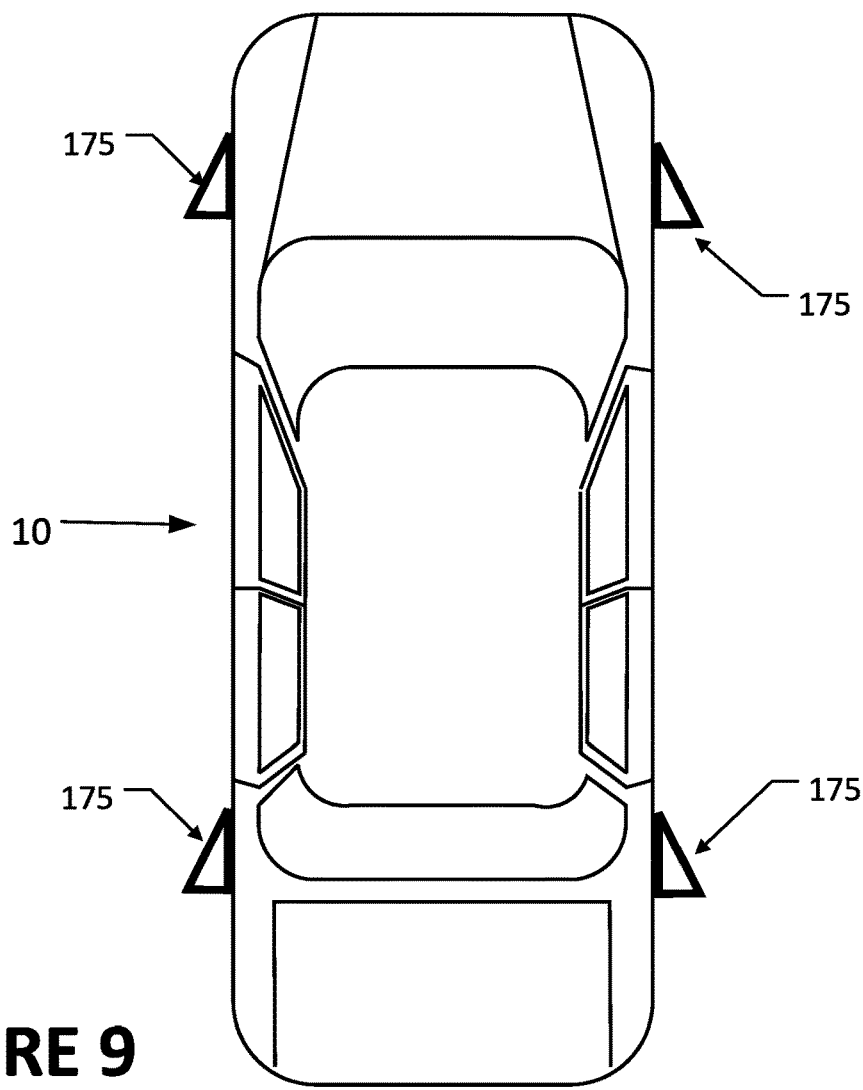
FIGURE 9

SYSTEM AND METHOD FOR OPERATOR GUIDED IDENTIFICATION OF VEHICLE REFERENCE LOCATIONS FOR ADAS SENSOR ALIGNMENT

CROSS-REFERENCE TO RELATED APPLICATIONS

The present application is the US National Stage under 35 U.S.C. § 371 et. seq. of International Application No. PCT/US2020/021174, filed on Mar. 5, 2020, which is related to, and claims priority from, U.S. Provisional Patent Application Ser. No. 62/813,905 filed on Mar. 5, 2019, both of which herein incorporated by reference.

BACKGROUND OF THE INVENTION

The present application related generally to a system and method for facilitating alignment and calibration of advanced driver assistance system (ADAS) sensors onboard a vehicle, and in particular, to a system and method for enabling an operator to identify to a vehicle service system, a reference location on a vehicle surface for relative placement of ADAS calibration targets and/or fixtures in proximity to the vehicle undergoing service.

Within the automotive industry there are an increasing number of vehicle manufacturers producing vehicles equipped with onboard sensors for monitoring the external surroundings of the vehicles. These systems include Lane Departure Warning systems (LDW), Lane Keep Assist systems (LKA), Blind Spot Detection systems (BSD), collision mitigation braking systems (CMBS), Adaptive Cruise Control systems (ACC), peripheral vision camera systems, reverse camera systems (backup alarms), and night vision (infrared) camera systems. As vehicle sensor systems become more advanced, onboard systems rely on input received from these monitoring sensors to provide driver warnings, automate vehicle functions (such as parallel parking), and implement safety features (such as automatic collision avoidance braking and automatically maintaining vehicle spacing).

With increased reliance on the data obtained from these monitoring sensors, it is critical that the data provide an accurate representation of the operating environment for the vehicle, such as the location of surrounding objects, speed differentials between the vehicle and the surrounding objects, and movement of the vehicle itself relative to the surrounding objects. The procedures for alignment, calibration, and/or inspection of the monitoring sensors vary from vehicle to vehicle and from manufacturer to manufacturer, due to the wide range of different types of monitoring sensors entering the market. As seen in FIGS. 1-3, monitoring and range-finding onboard vehicle sensors may require mechanical alignment relative to the vehicle body or to a measured alignment angle of the vehicle, such as the thrust line. Some sensors require calibration with the use of observable, reflective, or retro-reflective targets and/or fixtures disposed at predetermined positions within the sensor's field of view, and which may be a significant distance away from the vehicle.

Vehicle wheel alignment measurement systems or inspection systems may be utilized to facilitate positioning targets and/or fixtures relative to measured alignment angles of a vehicle. For example, as shown in WO 2018/067354 A1 to *Hunter Engineering Company*, (incorporated herein by reference) a vehicle wheel inspection system may be equipped various features to facilitate the placement of targets and/or fixtures in proximity to a vehicle undergoing service. These features include laser projectors mounted to gimbal actuators, under control of the vehicle inspection system control unit. During operation, the control unit utilizes cameras to observe the positions and orientations of the vehicle's wheels, identifying various wheel alignment angles and vehicle reference lines, such as the vehicle thrust line and the vehicle centerline. Once the vehicle's position and orientation relative to the vehicle inspection system is established, the gimbal actuators are operated by the control unit to orient the laser projectors to illuminate target and/or fixture placement locations on the floor or other surfaces in proximity to the vehicle, at relative locations specified by the vehicle manufacturer's guidelines.

Some vehicle manufacturers do not specify target and/or fixture placement locations relative to vehicle reference lines. Instead, instructions for locating and placing targets and/or fixtures for use during vehicle ADAS sensor calibration or alignment are referenced to specific points or features located on the vehicle. For example, a service operator may be instructed to identify a target and/or fixture placement location by starting from the location of a decorative ornament or badge located on a vehicle body panel, or from a reference point on the vehicle's bumper or structure. The operator is often required to manually measure out and locate these placement positions using tape measures and angle measurement tools. This type of vehicle-specific reference points or features cannot be easily identified or located automatically utilizing vehicle wheel alignment measurement systems or vehicle inspection systems. Without an ability to identify or locate specific reference points or features on the surface of a vehicle, a vehicle wheel alignment measurement system or vehicle inspection system such as shown in WO 2018/067354 A1 to *Hunter Engineering Company* cannot automatically identify the proper location, relative to the vehicle, for placement of the targets and/or fixtures.

Accordingly, there is a need to provide a method and a system for directly identifying a relative location of one or more vehicle-specific reference points within a spatial coordinate system of a vehicle wheel alignment system or vehicle inspection system to enable the relative placement locations for targets and/or fixtures to be automatically calculated and indicated in accordance with vehicle manufacturer placement guidelines.

BRIEF SUMMARY OF THE INVENTION

Briefly stated, the present invention is directed towards improvements to a vehicle wheel alignment system or vehicle inspection system configured with an optical projection system under operator control configured to enable an operator to identify, to the system, a location of a reference point on a vehicle surface from which relative locations for placement of ADAS sensor calibration or alignment targets can be subsequently identified.

In an embodiment of the present disclosure, a vehicle wheel alignment system or vehicle inspection system incorporating a pair of gimbal-mounted optical projection systems is configured with an input interface for operator-directed steering of each optical projection system. A controller operatively coupled to the optical projection systems and the input interface receives operator commands to selectively orient the projection axis for each optical emitter of the optical projection system towards a reference location on a surface in proximity to the vehicle wheel alignment or inspection system, illuminating the location. Signals indicative of an orientation of each optical emitter about three-axes of rotation (pitch, yaw, roll) are received at the controller. The controller is programmed with software instructions to utilize the received signals, together with known locations for the optical projection systems, to calculate a three-dimensional coordinate for the illuminated reference location at the intersection of the projection axes in an established frame of reference. The controller is further programmed with software instructions to utilize the calculated three-dimensional coordinate of the illuminated reference location as an origin point for calculating one or more placement locations within the established frame of reference for ADAS sensor calibration or alignment targets and/or fixtures.

In a further embodiment of the present disclosure, the input interface of the vehicle wheel alignment system or vehicle inspection system includes a game-pad or joy-stick style interface configured to enable an operator to selectively direct movement of each gimbal-mounted optical projection system about at least three axes of rotation.

In a further embodiment of the present disclosure, each gimbal-mounted optical projection system includes a laser emitter configured to project an illuminating laser beam along the associated projection axis.

A method of the present disclosure for determining one or more placement locations within an established frame of reference for ADAS sensor calibration or alignment targets initially requires an operator to identify an origin location on a surface of a vehicle undergoing inspection or service. A pair of gimbal-mounted optical projection systems having a fixed relationship to each other are selectively controlled by the operator to each align an associated illuminating projection axis with the origin location. Once aligned, the pitch, yaw, and roll of the associated projection axes, together with the known relative spatial relationship of each projection system within a common spatial frame of reference, are utilized to determine a three-dimensional coordinate of the illuminated origin location within the common spatial frame of reference. Placement locations for the ADAS sensor calibration or alignment targets within the common spatial frame of reference, relative to the determined origin location, are directly calculated from vehicle manufacturer guidelines.

In a further embodiment, the present disclosure sets forth a method for identifying, to an operator, one or more spatial locations within a common frame of reference for placement of a calibration fixture or free-standing target during an ADAS sensor calibration or alignment procedure. Initially, a spatial coordinate located within a frame of reference is selected for placement of the calibration fixture or target. A first gimbal-mounted optical projection system disposed at a known location within the frame of reference is activated to align a first projection axis with a target zone associated with the spatial coordinate. A second gimbal-mounted optical projection system disposed at a second known location within the frame of reference is activated to align a second projection axis with the target zone, such that the first and second projection axis each pass through, or intersect within, a spatial volume of the target zone. A calibration fixture or target is then positioned within the frame of reference such that a select surface of the calibration fixture or target is located within the target zone and is illuminated by the light projected along each of the first and second projection axes.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is an illustration of a procedure to calibrate an unknown viewing axis of a Lane Departure Warning (LDW) onboard vehicle sensor relative to a vehicle thrust line;

FIG. 2 is an illustration of a procedure to calibrate an unknown steering axis of an Active Front Steering (AFS) onboard vehicle sensor relative to a vehicle thrust line;

FIG. 3 is an illustration of a procedure to calibrate an unknown viewing axis of an Automatic Cruise Control (ACC) range-finding onboard vehicle sensor relative to a vehicle thrust line;

FIG. 9 illustrates the vehicle inspection system camera support structure of FIG. 4 in use with a method of the present disclosure to identify a target zone in 3D space to facilitate placement of a vehicle service fixture.

Corresponding reference numerals indicate corresponding parts throughout the several figures of the drawings. It is to be understood that the drawings are for illustrating the concepts set forth in the present disclosure and are not to scale.

Figure 4:
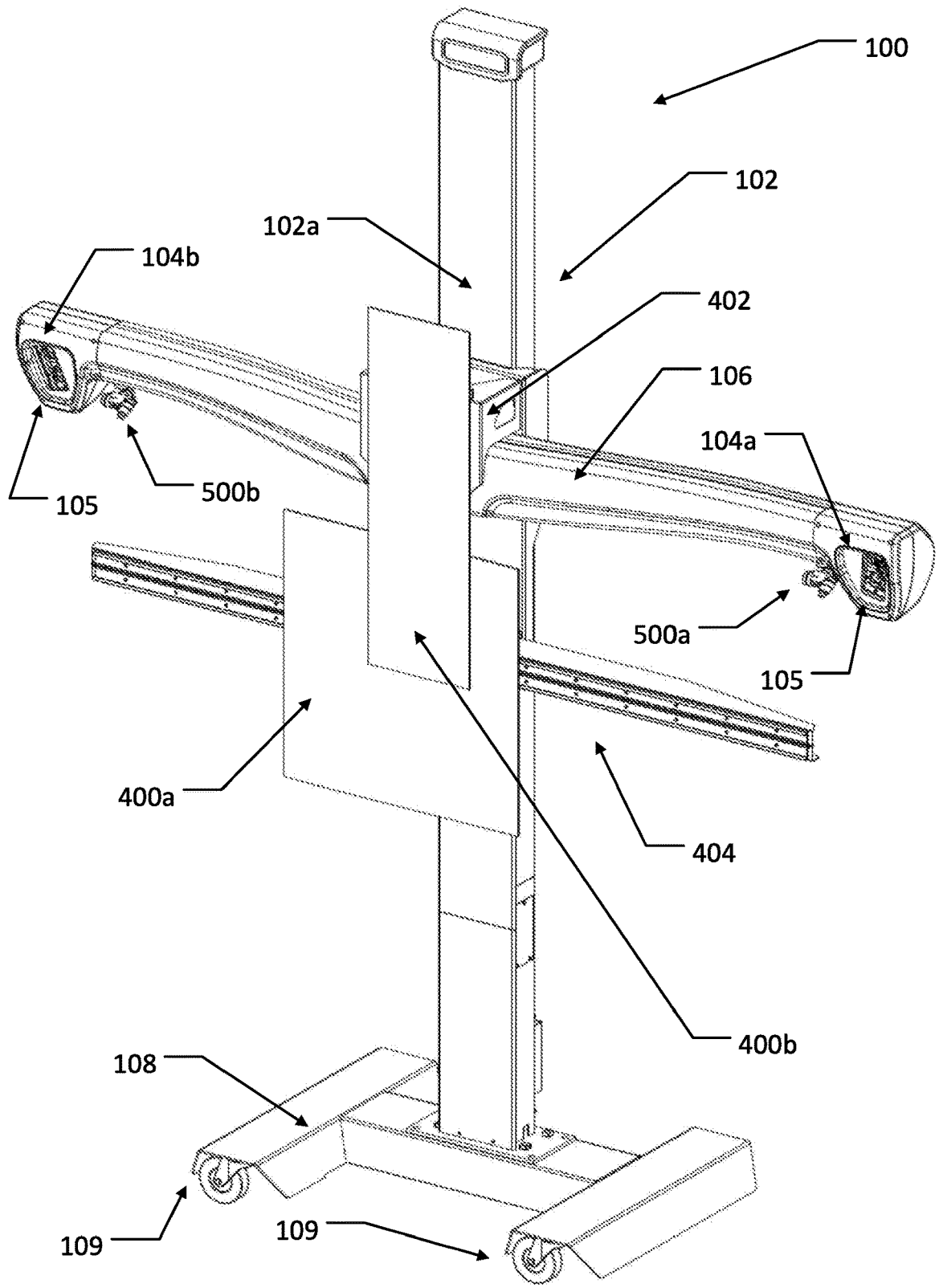
FIG. 4 is a perspective view of a prior art vehicle inspection system camera support structure configured with ADAS targets and a pair of gimbal-mounted optical projectors.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to FIG. 4, an instrumentation fixture or support structure 100 of a prior art machine-vision vehicle service system, such as a vehicle wheel alignment system or vehicle inspection system, is shown. The vehicle measurement system instrumentation structure 100 as shown includes a camera support structure 102, consisting of a vertical column 102a, supporting a set of laterally spaced camera modules 104a, 104b carried on a crossbeam 106, together with at least one calibration assistance target 400a, 400b6. A pair of optical projection systems 500a, 500b, are carried in a spaced relationship by the camera support structure 102.

To facilitate positioning of the vehicle measurement system instrumentation structure 100 during a service procedure, and to enable the set of camera modules 104a, 104b to view features on each lateral side of a vehicle, the structure 100 is provided with a base unit 108 having a set of rolling elements, such as casters or wheels 109. During use, the structure 100 is manually rolled into a desired position. Different vehicles may require the structure 100 to be positioned at different locations relative to the vehicle. An optional locking mechanism may be provided on at least one of the rolling elements, to prevent accidental movement of the structure 100 during use.

The camera support structure 102 locates the set of camera modules 104a, 104b adjacent opposite longitudinal ends, each containing one or more cameras 105 with fields of view in a generally forward direction as required to view each lateral side of the vehicle 10 undergoing service. The camera crossbeam 106 is optionally vertically (and/or rotationally) adjustable relative to the vertical column 102a to permit adjustments to accommodate elevation changes to a vehicle located on an adjustable lift rack (not shown) in proximity to the vehicle measurement system instrumentation structure 100. Vertical adjustments to the camera crossbeam 106 may be by any conventional means, such as sliding rails, rod and screw mechanisms, pulley mechanism, etc. The mechanism for vertical adjustments can be manually actuated, or may be driven by a suitable motor under either operator manual control or automatic software control. Rotational adjustments of the camera crossbeam 106 about a longitudinal axis, if provided for, about the longitudinal axis of the camera crossbeam 106 may be by any conventional means, and may be manually actuated, or may be driven by a suitable motor either under manual control of an operator or under automatic software control. As an alternative to rotationally adjusting the camera crossbeam 106, individual camera modules 104a, 104b may be optionally configured with suitable coupling mechanisms to permit multi-axis independent movement as required to achieve desired fields of view with the cameras 105.

It will be recognized that while the embodiment of the vehicle measurement system instrumentation structure 100 illustrated in FIG. 4 and described above utilizes a vertical column 102a and a camera crossbeam 106, other configurations of a camera support structure 102 may be utilized without departing from the scope of the present invention. For example, in place of the vertical column 102a and camera crossbeam 106, a camera support structure 102 may consist of a pair of articulated camera support arms secured to the base 108 to position individual cameras in laterally spaced arrangements as required to achieve the fields of view necessary to observe features or targets associated with a vehicle undergoing a wheel alignment service, measurement, or inspection.

The camera modules 104a, 104b are operatively coupled to a processing system 300, which may be disposed within an associated operator-interface console 302 in proximity to the vehicle measurement system instrumentation structure 100. The processing system 300 is configured with suitable logic circuit components and with software instructions for receiving image data from the camera modules 104a, 104b, evaluating the image data to identify relative spatial positions of observed surfaces, such as optical targets 175 disposed on the wheels or surfaces of a vehicle 10, and for computing associated vehicle characteristics, such as wheel alignment angles, vehicle thrust line, or vehicle body position (center line). It will be understood that the configuration of the processing system 300, camera modules 104a, 104b, and associated operator-interface console 302 are generally known in the art of machine vision vehicle wheel alignment systems, and may vary from the specific configuration described herein without departing from the scope of the invention, so long as the processing system 300 is configured with software instructions as described herein.

To facilitate alignment and calibration of safety system sensors onboard a vehicle 10, such as radar, LIDAR or optical sensors, one embodiment of the vehicle measurement instrumentation structure 100 includes at least one target structure 400a and/or 400b affixed to the vertical column 102a or camera crossbeam 106, by a multi-axis mounting fixture 402. Each target structure 400a, 400b includes an observable target face oriented in a generally forward direction from the structure 100 (i.e., towards the vehicle service area), at an elevation generally suitable for observation by the vehicle safety system sensors during a realignment or recalibration procedure. The specific configuration of the target structures 400a, 400b, such as the target face features, is related to, and will vary with, the specific type of safety system sensor for which it will be used. For example, an optical target 400a having retro-reflective or contrasting target face surface features may be provided for use with optical safety system sensors such as cameras or LIDAR. Correspondingly, a metallic or radar-reflective target 400b may be provided for use with radar-based safety system sensors. Optionally, a laser emitter (not shown) configured for pivoting adjustment about at least one axis may be associated with the target structure 400a, 400b for use in illuminating a point or line on the vehicle or nearby floor surface to aiding in positioning and/or orienting either the target structure 400a, 400b individually, or the vehicle measurement system instrumentation structure 100 itself.

Figure 5:
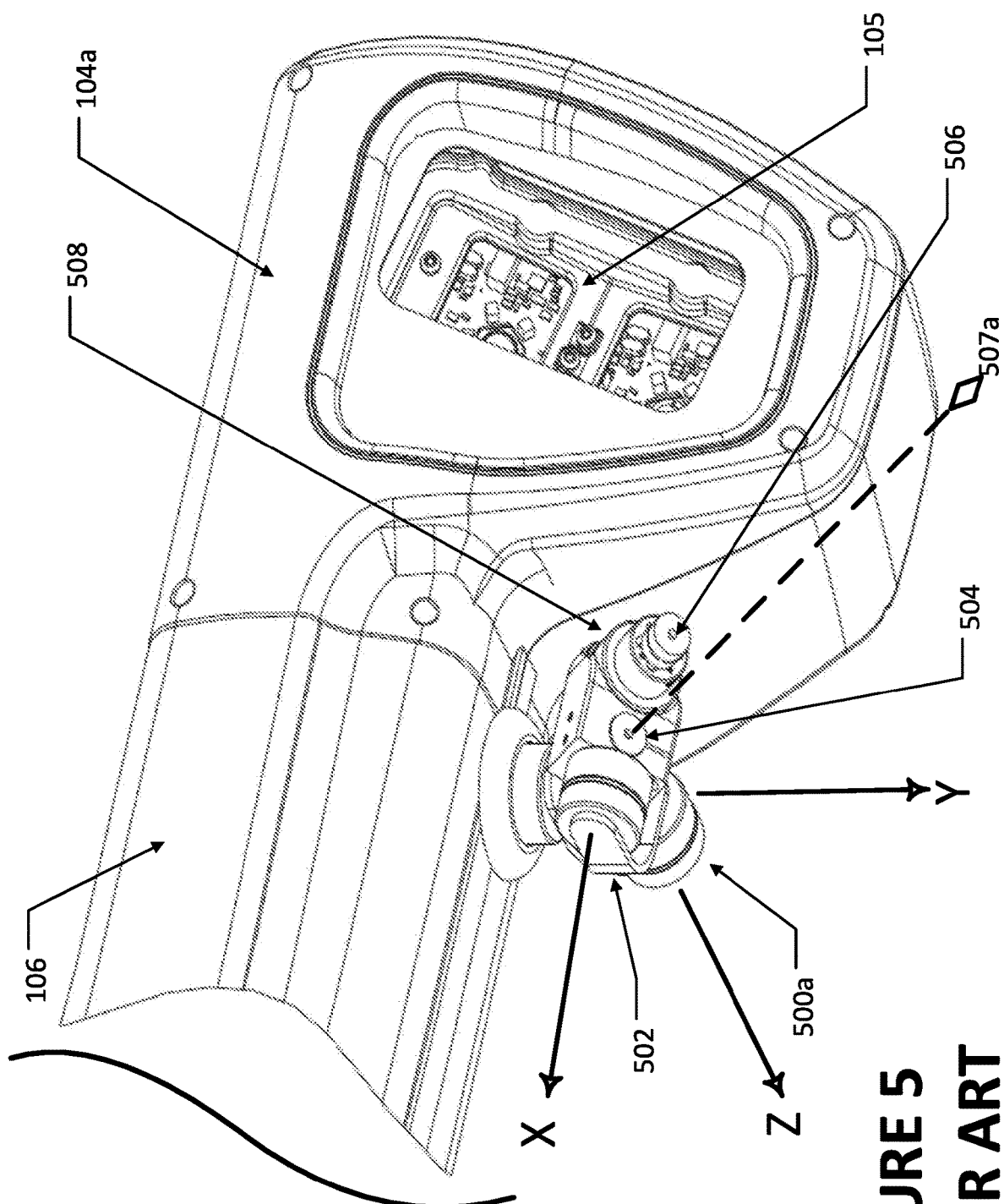
FIG. 5 is a close-up perspective view of a prior art gimbal-mounted optical projector.

As seen in FIG. 4, the vehicle measurement system instrumentation structure 100 includes one or more optical projection systems 500a, 500b operatively coupled to, and under control of, the processing system 300, for the projection of visible indicia 501 onto surfaces in proximity to the structure 100. The optical projection systems 500a, 500b, seen in FIG. 5, each comprise one or more laser emitters 504, 506 carried by a mounting structure 502, such as a set of motorized gimbals, secured to the camera support beam 106. The optical projection systems 500a, 500b are disposed in a spaced arrangement, in proximity to the camera modules 104a and 104b, enabling projection of visible indicia onto surfaces located within the vehicle service area surrounding the vehicle measurement system instrumentation structure 100. Each optical projection system 500a, 500b includes at least one associated laser emitter 504 secured to the set of mounting structures 502 under control of the processor 300 for rotational movement about three orthogonal axis (X, Y, Z) to orient an associated projection axis (generally 507, specifically 507a, 507b) in 3D space. Optionally, a second associated laser emitter 506 is supported by a rotating element 508 on the mounting structure 502, for rotation about an additional axis, enabling projected indicia to be visually corrected for parallax distortion resulting from non-orthogonal projection orientations.

The laser emitters 504 transmit beams of visible light along a projection axes 507a, 507b associated with the respective projection system (500a, 500b). Optical focusing elements may be provided to render the visible indicia in the form of spots or lines, onto the targeted surfaces. It will be recognized that the optical projection systems 500a, 500b may utilize other sources of visible light, such as LED elements, and associated optical focusing elements in place of the laser emitters 504, 506 to project visible indicia onto the surfaces without departing from the scope of the present disclosure. Correspondingly, it will be recognized that within the optical projection systems 500a, 500b, and the mounting structures 502, such as the motorized gimbals, may be replaced by any of a variety of conventional optical components, such as lenses or MEMS mirrors, for orienting the associated projection axes 507a, 507b. Alternatively, one of the optical projection systems 500a, 500b may have a fixed projection axis calibrated to a known orientation relative to the other optical projector.

Figure 10:
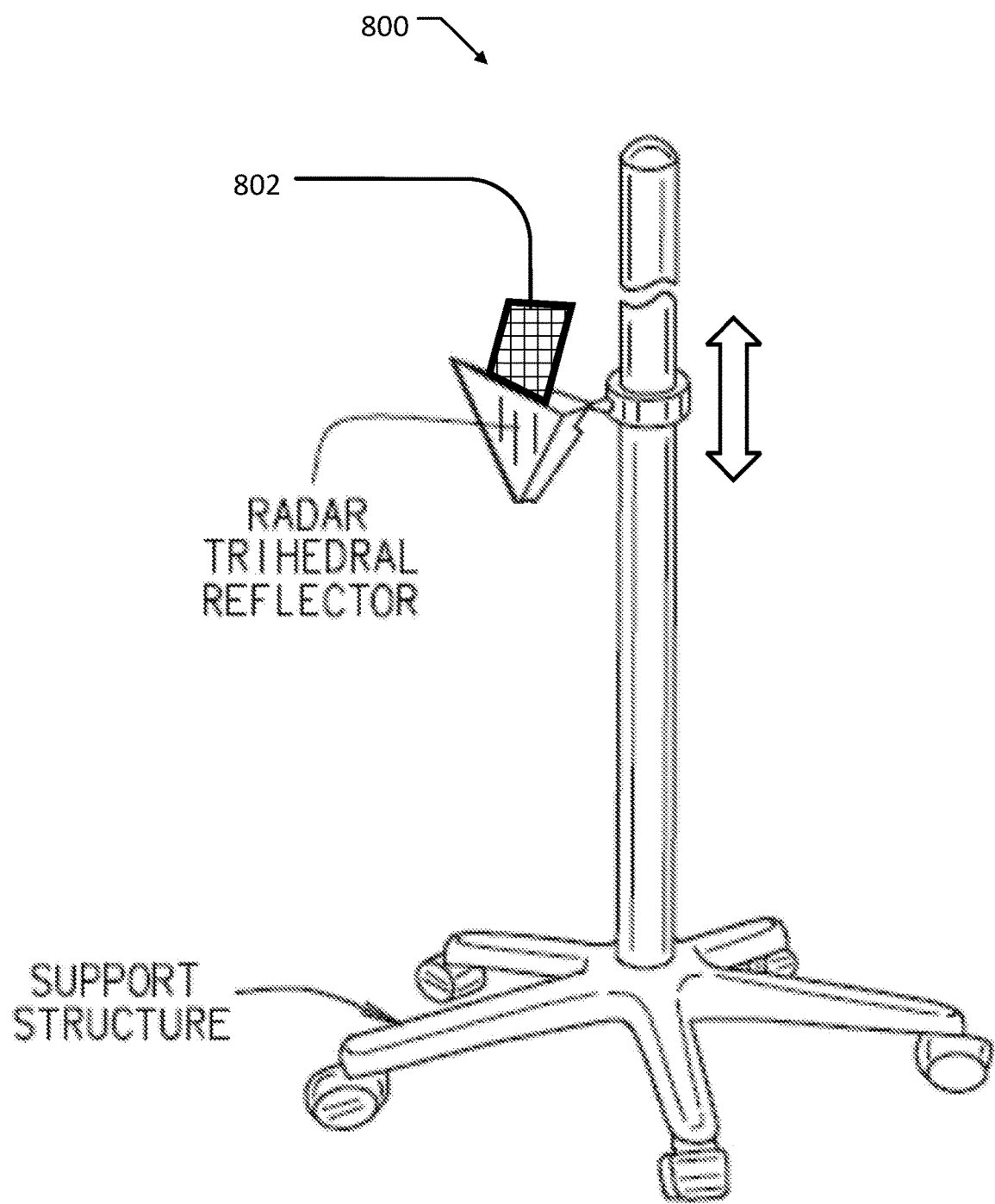
FIG. 10 is a perspective view of a movable calibration fixture having a trihedral radar wave retro-reflective structure together with a placement target surface to assist in relative positioning at the target zone of FIG. 9.

During a vehicle wheel service, measurement, or inspection procedure, the processing system 300 is configured to communicate with each optical projection system 500a, 500b, to direct orientation of the associated laser emitters 504, 506 for projection of associated observable indicia (generally 501, specifically 501a, 501b) at selected locations on surfaces in proximity to the vehicle measurement system instrumentation structure 100. The observable indicia 501 may represent lines or boundaries against which an elongated planar optical target 600 or other vehicle service device may be aligned, or may represent stationary point locations to aid in the placement of a vehicle service fixtures for free-standing targets 800, such as shown in FIG. 10.

Conventionally, the selected locations for projection of the observable indicia 501 is determined by the processing system 300 in response to spatial measurements of associated with the vehicle 10 acquired from images captured by the camera modules 104a, 104b. For example, some vehicle safety system sensor calibration procedures require the placement of free-standing target 800, observable by onboard vehicle safety system sensors, at select locations relative to the vehicle's center line or thrust line. Specific placement requirements associated with ADAS sensor calibration or adjustment procedures for a variety of vehicle makes and models may be stored in a database accessible to the processing system 300. After determining measurements associated with the relative spatial position of the vehicle 10 to the fixture or support structure 100, such as by conventional machine vision vehicle alignment measurement procedures, the processing system 300 is configured to access the database to recall placement requirements for targets or calibrations fixtures associated with the vehicle. Utilizing the recalled placement requirements, the processing system 300 operates the set 502 of motorized gimbal mounting structures to orient one or both of the optical projectors to project visible indicia 501 at the appropriate locations on the floor surface of the vehicle service area, enabling an operator to carry out or complete a vehicle service, calibration, or inspection procedure. Alternatively, for fixed optical projectors, an operator may be guided to adjust the position and/or orientation of the vehicle measurement instrumentation structure 100 itself to align a projection axis as required.

Not all vehicle manufacturers reference placement locations for fixtures or free-standing targets associated with ADAS sensor calibration or adjustment procedures to determinable properties of the vehicle such as a thrust line or a centerline. The ADAS sensor calibration or adjustment procedures for some vehicles direct an operator to place fixtures or free-standing targets associated with ADAS sensor calibration or adjustment procedures at locations referenced to specific features or locations on the vehicle. For example, a fixture or free-standing target placement location may be called for at a selected distance forward of an emblem located on the vehicle hood, or at a position which is both forward of, and laterally offset from, an identified fastener or adjustment bolt securing a component to the vehicle. In order to complete procedures requiring placement of fixtures or targets at such locations, an operator is typically required to utilize measuring tapes, strings, right-angle rulers, and plumb bobs. Starting from the instructed origin point OP on the vehicle, the operator will manually measure out required distances and angles until the correct placement location is reached.

An embodiment of the present disclosure utilizes the optical projection systems 500a, 500b of the vehicle measurement system instrumentation structure 100, together with the processing system 300, to eliminate the need for an operator to manually measure out and identify placement locations for fixtures or free-standing targets used during ADAS sensor calibration or adjustment procedures which are referenced to specific features or locations on the vehicle. In place of conventional manual procedures, the operator identifies to the processing system 300, by use of the optical projection systems 500a, 500b, the specific feature or location on the vehicle which is to be utilized as the origin point OP for relative placement of the fixture or free-standing targets. Each optical projection system 500a, 500b is configured such that the orientation of the gimbals or fixed projection axes 507a, 507b is known to the processing system 300, establishing an associated pointing axis for each laser projector in three-dimensional space. In one embodiment, an operator interface is provided via the console 302 to enable the operator to utilize an operator input to selectively align a laser projector pointing axis 507a, 507b for each adjustable optical projection system 500a, 500b by controlling the individual gimbals or other adjustable components to achieve movement about each available coordinate axis X, Y, Z (i.e., pitch, yaw, roll). The operator interface console 302 may include a physical input device, such as a game controller, keypad, or joy-stick, or interactive elements presented within a graphical user interface (GUI) displayed to the operator.

Figure 6:
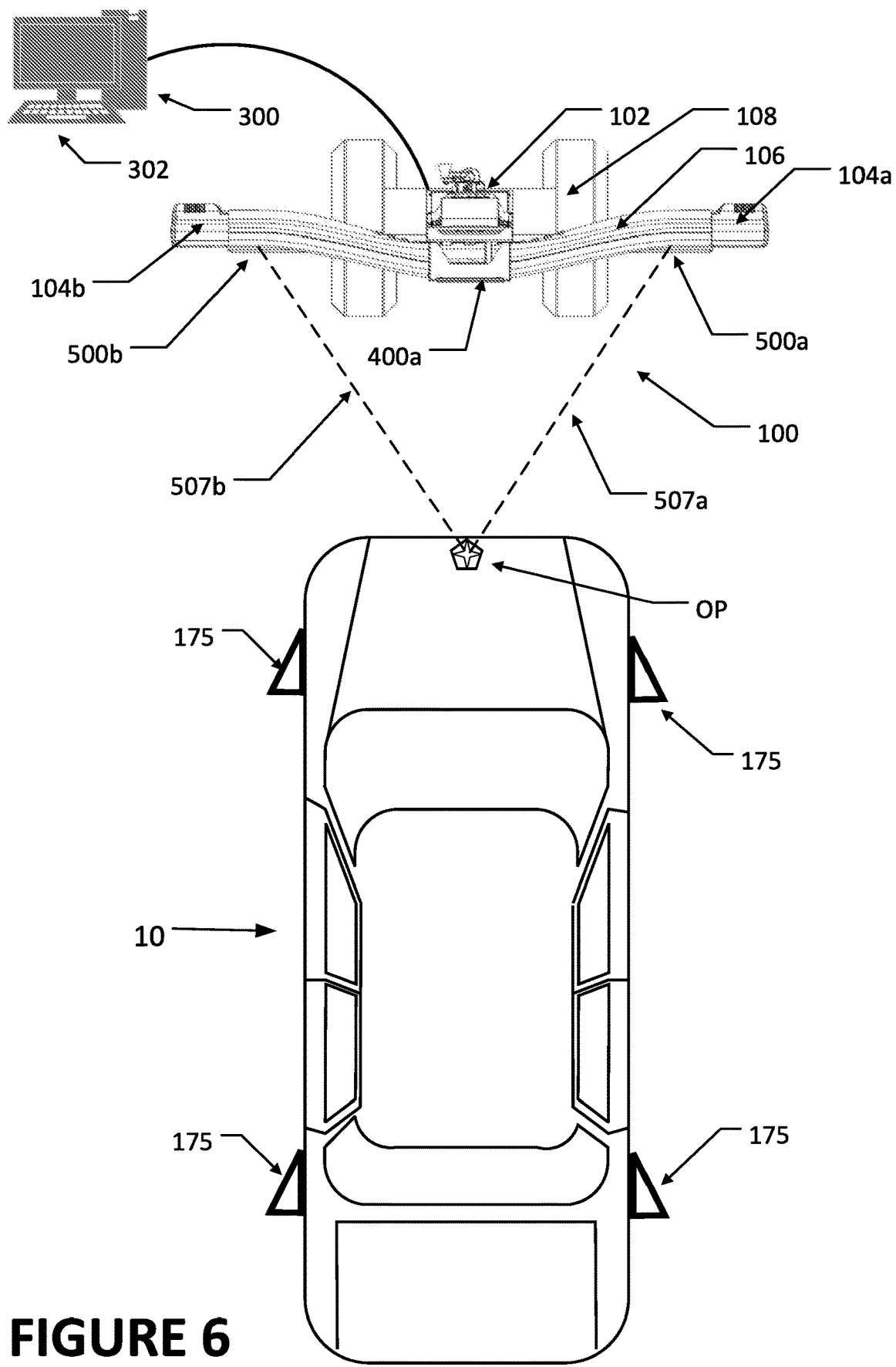
FIG. 6 illustrates the vehicle inspection system camera support structure of FIG. 4 in use with a method of the present disclosure to facilitate identification of the relative location of a feature on a vehicle surface.

Using the operator interface, the operator activates each optical projection system 500a, 500b to project a spot of illumination along an associated laser projection axis 507a, 507b, onto a surface of the vehicle. The operator next orients each optical projection system 500a, 500b, such that the projection axis 507a, 507b from each optical projector 504 intersect, as shown in FIG. 6, at the specific feature or location on the vehicle which is to be utilized as an origin point OP.

In an alternate embodiment, the operator may place a reference target, such as a retroreflective sticker, at the specific feature or location on the vehicle which is to be utilized as an origin point OP. The processing system is configured to locate the reference target within the field of view of the camera modules 104a, 104b, and to automatically orient each optical projection system 500a, 500b such that the projection axis 507a, 507b from each optical projector 504 are aligned with, and intersect at, the reference target.

Once the optical projection systems 500a, 500b are both oriented, either manually or automatically, the operator directs the processing system 300 to calculate the relative spatial coordinates of the at which the projection axes 507a, 507b intersect. The processing system 300 is configured with software instructions to utilize the known orientations of each projection axis 507a, 507b, which define unit vectors in a common frame of reference, together with the known position of each optical projection systems 500a, 500b in the same frame of reference to determine the point of intersection. For example:

Optical projection system 500a is located at coordinates $x_1, y_1, z_1$, and has an associated laser projector 504 projection axis 507 defined by unit vector $a_1, b_1, c_1$;

Optical projector 500b is located at coordinates $x_2, y_2, z_2$, and has an associated laser projector 504 projection axis 507 defined by unit vector $a_2, b_2, c_2$.

Each laser projection axis 507a, 507b can then be defined as a line with the following parametric equations:

$$\text{Line1}: x=x_1+a_1*r_1; y=y_1+b_1*r_1; z=z_1+c_1*r_1; \quad \text{Eqn. 1}$$

$$\text{Line2}: x=x_2+a_2*r_2; y=y_2+b_2*r_2; z=z_2+c_2*r_2. \quad \text{Eqn. 2}$$

Figure 7:
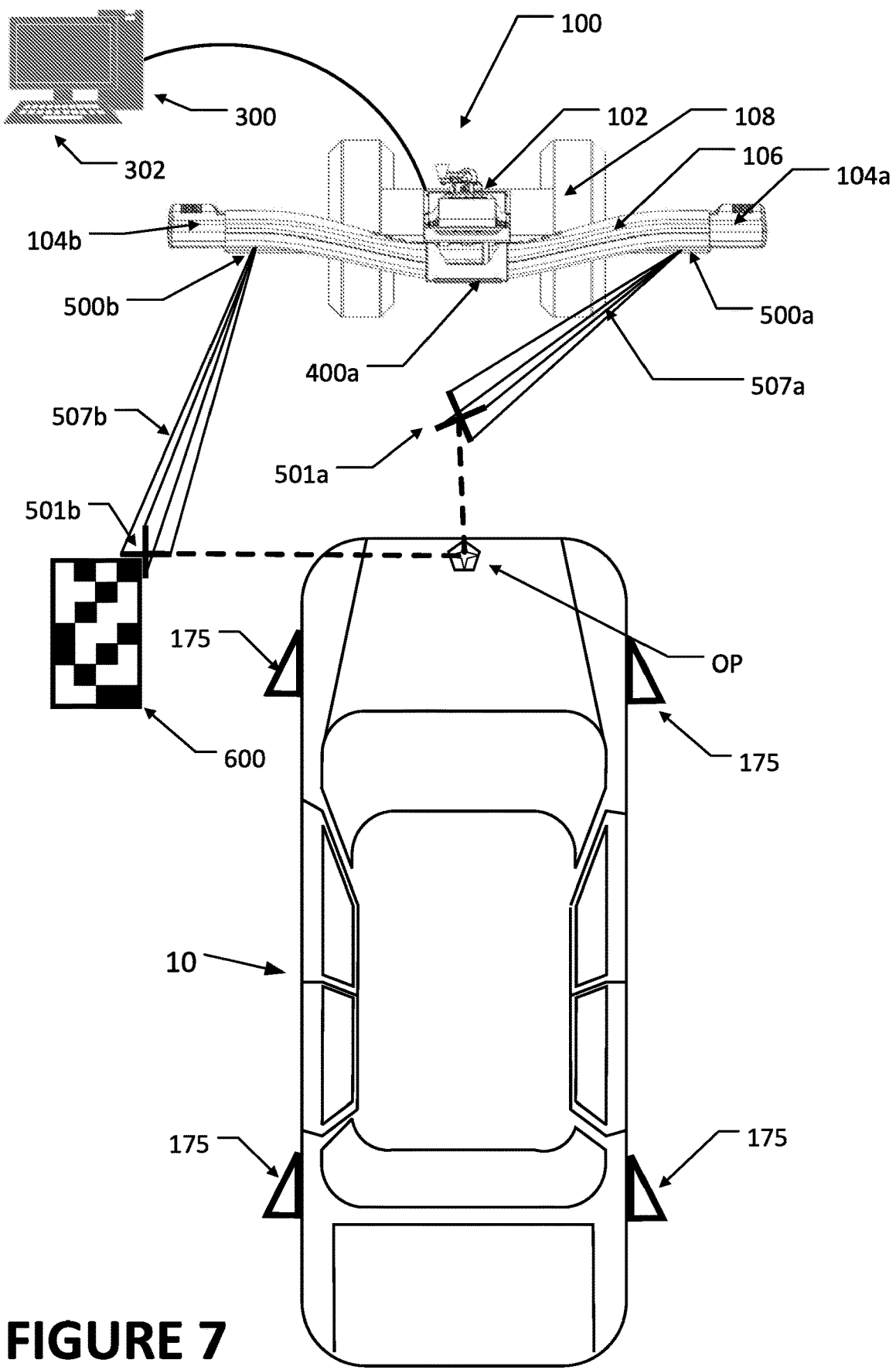
FIG. 7 illustrates the vehicle inspection system camera support structure of FIG. 4 in use with a method of the present disclosure to illuminate target placement locations referenced to an identified relative location of a feature on the vehicle surface.
Figure 8:
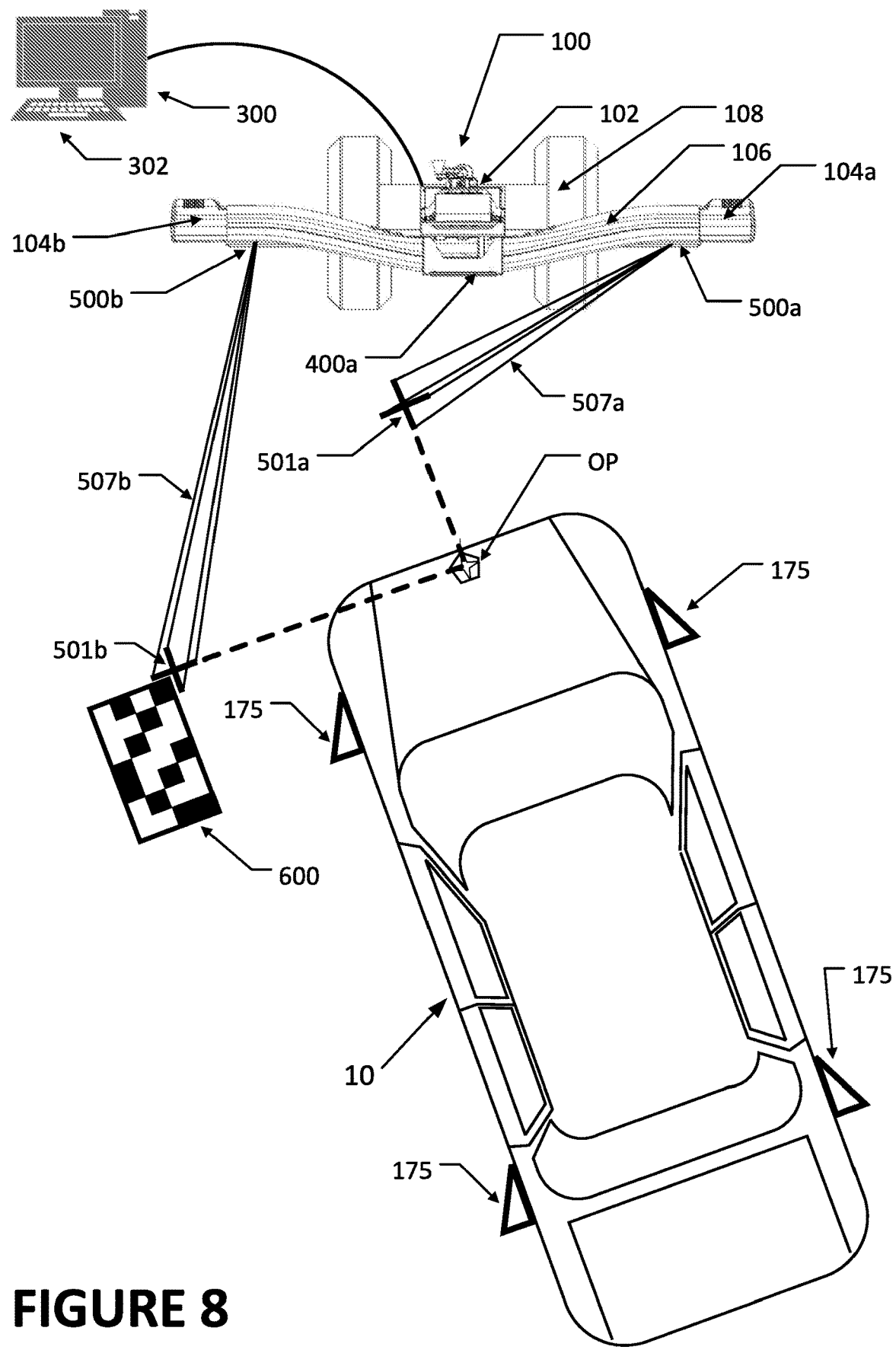
FIG. 8 is similar to FIG. 7, but with the vehicle shown at an angle relative to the vehicle inspection system camera support structure, illustrating a change in the illuminated target placement locations corresponding to the different angle of the vehicle.

At the point of intersection for the two lines, the x and y values are equal (as is the z value), so the equations can be expressed as:

$$x_1+a_1*r_1=x_2+a_2*r_2; \quad \text{Eqn. 3}$$

$$y_1+b_1*r_1=y_2+b_2*r_2; \quad \text{Eqn. 4}$$

$$z_1+c_1*r_1=z_2+c_2r_2; \quad \text{Eqn. 5}$$

where $r_1$ and $r_2$ are the distances along the respective unit vectors $(a_1, b_1, c_1)$ and $(a_2, b_2, c_2)$ to the intersection point. Solving these equations for $r_1$ and $r_2$, the original parametric equations (Eqns. 1 and 2) can be solved for the point of intersection in the common frame of reference. Together with information identifying the orientation of the vehicle 10, such as from observations of the optical targets 175 by the camera systems 104a, 104b, the calculated coordinates for the point of intersection are then used by the processing system 300 as the origin point OP for identifying relative placement locations for fixtures or free-standing targets 600, 800 utilized in an ADAS sensor calibration or adjustment procedure, such as shown in FIGS. 7 and 8.

It will be recognized that alternate embodiments in which the optical projection systems 500a, 500b are not mounted to the same support structure 100 may be implemented without departing from the scope of the present invention, so long as the processing system 300 is configured to determine the orientations of each projection axis 507a, 507b, which define the unit vectors in the common frame of reference, and to recall or determine the position of each optical projection system 500a, 500b in the same common frame of reference. For example, each optical projection system 500a, 500b may be disposed on a separate support column, pedestal, or wall surface on opposite lateral sides of a vehicle inspection or service area. Relative positions of each optical projection system 500a, 500b may be established by any suitable calibration procedure, or by direct measurement, and the results stored in a data storage accessible by the processing system 300.

In an alternate embodiment, one or more cameras or optical sensors (not shown) having fields of view which encompass the vehicle surfaces on which the origin point OP is located are provided on the support structure 100. The origin point OP is located with an image of the vehicle surface, either automatically using machine vision technology and/or pattern matching (such as to locate a placed target, logo, vehicle badge, etc.) or manually by an operator identifying the origin point OP in an image presented on a graphical user interface (GUI) by the processing system 300. Once the origin point is identified, the processing system directs the optical projection systems 500a, 500b to orient the associated projection axes 507a, 507b to intersect at the identified origin point OP, enabling calculation of the spatial coordinates of the origin point within the common frame of reference, as described above. The processing system 300 may be configured with software instructions to direct the optical projection systems 500a, 500b to orient the projection axes 507a, 507b utilizing a feedback process in which changes in position of the illuminated points associated with each laser pointing axis are observed in a set of images acquired by the cameras or optical sensors.

It will be recognized that due to inherent limitations in the mechanical and electrical systems associated with the optical projector gimbals, the orientations of the projection axes 507a, 507b may not be determinable with a high degree of precision. Furthermore, due to optical characteristics of the emitted laser light, what appears to be an intersection of the two emitted beams as observed by an operator may not be a true intersection of the projection axes 507a, 507b. Accordingly, it is understood that as used herein, the term "intersection" means an intersection of the projection axes 507a, 507b to within a tolerance of the mechanical, electrical, and optical systems. The intersection point may be treated as an area, region, or volume of 3D space within the common frame of reference in which the projection axes 507a, 507b have a closest approach to each other, particularly when they do not fully intersect at a defined point. Accordingly, the "point of intersection" as used to define the origin point OP for subsequent calculations, may be an approximation or a point which is calculated, such as by a midpoint between the points of closest approach on each of the individual projection axes 507a, 507b.

Vehicle manufacturer's instructions for placement of a fixture or target 600, 800 relative to an identified origin point OP on a vehicle may be stored in, and recalled from, a database accessible to the processing system 300. The processing system 300 is configured with software instructions to utilize manufacturer instructions associated with the specific vehicle undergoing a service or inspection to calculate fixture or target placement locations in the common frame of reference, in the same manner as when starting from a determined vehicle centerline or thrust line.

To assist the operator with placing the fixtures or targets 600, 800 at the calculated placement locations, the processing system 300 is configured to control the optical projection systems 500a, 500b, to orient each laser emitter 504, 506 to project the observable indicia 501 at a selected location on a surface in proximity to the vehicle measurement system instrumentation structure 100. The observable indicia 501 may represent either a stationary point location to aid in the placement of a free-standing target 800, or may represent lines or boundaries against which an elongated planar optical target 600 or other vehicle service device may be aligned. The processing system 300 may optionally control the optical projection systems 500a, 500b, to impart motion to the projected indicia, such as to sequentially illuminate two or more discrete locations on said surface. Indicia other than points or lines, such as alphanumeric symbols, or raster images, may be projected under control of the processing system 300 from suitably configured optical projectors 504, 506 within the scope of the present disclosure.

A method of the present disclosure sets forth procedures for operating a vehicle service system, such as a vehicle wheel alignment measurement or inspection system, to determine a placement location within an established frame of reference for an ADAS sensor calibration or alignment targets. The method requires an operator to identify an origin point OP on a surface of a vehicle undergoing inspection or service. To identify the origin point OP, the operator individually controls each of the optical projection systems 500a, 500b mounted on a support structure 102 of the vehicle service system to adjust pitch, yaw, and roll of each associated projection axis 507a, 507b, such that beams of projected light intersect at the origin point OP. With each optical projection system 500a, 500b disposed at a fixed location on the vehicle service system, defined within a common frame of reference, a pitch, yaw, and roll of each projection axis 507a, 507b, together with the known relative spatial relationship of each projection system 500a, 500b within the common spatial frame of reference, are utilized to calculate three-dimensional coordinates of the illuminated origin point OP within the common spatial frame of reference.

Once the three-dimensional coordinates of the origin point OP are identified within the common spatial frame of reference, vehicle manufacturer instructions for the placement of ADAS sensor system calibration or alignment targets or fixtures 600, 800 relative to the origin point OP are utilized to directly calculate placement locations within the common spatial frame of reference. At least one of the optical projection systems 500a, 500b is controlled to adjust the pitch, yaw, and roll of an associated projection axis 507, such that at least one emitted beam of light is projected onto the calculated placement location, providing visible indicia 501 to guide an operator for placement of the target or fixture 600, 800. With the target or fixture in place, an ADAS sensor system calibration or alignment is completed according to the vehicle manufacturer's guidelines.

Those of ordinary skill in the art will readily recognize that the systems and methods of the present disclosure may be utilized to define, as an origin point OP, points on surfaces other than those of a vehicle undergoing a service or inspection. The systems and methods of the present invention may be utilized to define an origin point OP, and hence identify a location of, or placement location for, fixtures, targets, structures, or locations on floors and walls onto which points of illumination may be projected from the optical projection systems 500a, 500b having established relative positions within a common reference frame as described herein.

For example, a method of the present invention may be utilized to guide placement of a vehicle service fixture 800 within a frame of reference encompassing a vehicle service bay. Initially, a spatial location within the frame of reference for placement of a vehicle service fixture, such as an ADAS calibration or alignment fixture is identified. The spatial location may be identified using any of a variety of suitable methods, such as described herein for referencing an identified origin point OP on a vehicle surface together with vehicle manufacturer's instructions for relative placement, by reference to an observed axis of a vehicle in accordance with a vehicle specific instructions recalled from a database, or by manually guidance from an operator. Once the spatial location is identified, a target zone TZ is established in association with the identified spatial location. The target zone TZ, as seen in FIG. 9, which may be defined as a contained volume of 3D space, or as a surface within the 3D space, is intended to accommodate accuracy limits introduced by various contributing sources of error associated with the mechanical and optical systems noted herein.

With the target zone TZ established, a first optical projection system 500a, 500b disposed at a known location within the frame of reference is operated to align a first associated projection axis 507a with the target zone TZ. The operation may be carried out manually by an operator guiding movement of the gimbal-mounted optical projection system to "steer" the first projection axis 507a into the target zone, or automatically under control of a processing system 300. Next, a second gimbal-mounted optical projection system 500a, 500b disposed at a second known location within the frame of reference is operated in the same manner to align a second associated projection axis 507b with the target zone TZ. With both projection axes aligned with the target zone, as shown in FIG. 9, they will both pass through, or intersect within, the target zone, facilitating the establishment of a visual indication in 3D space of the target zone TZ to aid an operator in placement of a target or fixture.

The visual indication of the target zone becomes apparent during positioning of a vehicle service fixture or free-standing target 800, such as shown in FIG. 10, within the frame of reference. An operator moves (such as across a floor surface) and adjusts (such as by changing height or orientation) the free-standing target 800 within the frame of reference such that a placement target surface 802 on the free-standing target 800 intersects with, and is located within, the target zone TZ. Once the placement target surface 802 is located within the target zone TZ, the placement target surface is illuminated by light projected along both the first and second projection axes 507a, 507b, indicating that the free-standing target 800 is correctly located within the frame of reference.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle measurement system instrumentation structure, comprising:
   a base unit;
   a camera support structure affixed to said base unit, said camera support structure carrying a set of camera modules configured to acquire images associated with a vehicle undergoing measurement;

a pair of optical projection systems carried in a spaced arrangement by said camera support structure, each optical projection system in said pair including at least one optical projector defining an associated projection axis originating at a known location within a common reference frame, and a mounting structure for rotational movement of said at least one optical projector about at least two axes (X, Y, Z);

a processing system operatively coupled to said pair of optical projection systems and to said set of camera modules, said processing system having a processor configured with a set of instructions to evaluate data received from each of said optical projection systems to determine orientations of said associated projection axes;

to identify, from said known locations of said optical projectors, together with said determined orientations of said associated projection axes, an origin point of intersection between said projection axes within said common frame of reference;

to receive and evaluate said acquired images from said set of camera modules to determine a position and orientation of said vehicle within said common frame of reference; and to control said optical projection systems to orient said projection axes to project said visible indicia to one or more placement locations relative to said vehicle based on at least said identified origin point of intersection between said projection axes and said determined position and orientation of said vehicle within said common frame of reference.

2. The vehicle measurement system instrumentation structure of claim 1 wherein each optical projector is a laser emitter.

3. The vehicle measurement system instrumentation structure of claim 1 wherein said processing system is further configured with said set of instructions to activate at least one optical projector in said pair of optical projection systems to project a visible indicia along said associated projection axis, onto a surface in proximity to said vehicle measurement system instrumentation structure; and wherein said processing system is operatively coupled to each optical projection system and configured with instructions to control an orientation of said associated projection axes by selectively rotating said associated mounting structures.

4. The vehicle measurement system instrumentation structure of claim 1 wherein said camera support structure includes:

a vertical support column affixed to said base unit;
a crossbeam carried by said vertical support column; and
wherein said optical projection systems in said pair are disposed adjacent opposite longitudinal ends of said crossbeam.

5. The vehicle measurement system instrumentation structure of claim 1 wherein each mounting structure is a set of motorized gimbals configured for rotational motion about at least three orthogonal axes (X, Y, Z), and wherein said processing system is configured to control said orientation of said projection axes by selectively driving one or more of said motorized gimbals within said set.

6. The vehicle measurement system instrumentation structure of claim 5, further including an operator interface, said operator interface operative coupled to each of said optical projection systems; and wherein said operator interface is configured to control said orientation of each of said projection axes by selectively driving one or more of said motorized gimbals in said associated optical projection system in response to operator input.

7. A method for operating a vehicle measurement system consisting of a base unit, a support structure affixed to said base unit, and a pair of optical projection systems carried in a spaced arrangement in a common frame of reference by said support structure, each optical projection system including an optical projector carried by a multi-axis gimbal mounting structure located at a known location within a common reference frame, comprising:

selecting an origin point on a vehicle undergoing a service or inspection in operative proximity to said vehicle measurement system;

projecting a first illuminating beam of light from a first optical projector in said pair along a first projection axis;

orienting said first optical projection system by driving a first associated multi-axis gimbal mounting structure to align said first projection axis with said selected origin point such that said first illuminating beam of light illuminates said selected origin point;

projecting a second illuminating beam of light from a second optical projector in said pair along a second projection axis;

orienting said second optical projection system by driving a second associated multi-axis gimbal mounting structure to align said second projection axis with said selected origin point, such that said second illuminating beam of light illuminates said selected origin point;

identifying orientations of said first and second projection axes within said common frame of reference; and calculating a position of said selected origin point within said common frame of reference using each of said identified orientations and said known locations of said multi-axis gimbal mounting structures for each of said first and second optical projection systems;

determining an orientation of said vehicle within said common frame of reference;

calculating a placement location in said common frame of reference relative to said vehicle orientation and said position of said selected origin point on said vehicle;

re-orienting said associated projection axis at least one of said optical projection systems by driving said associated multi-axis gimbal mounting structures to align said associated projection axis with said calculated placement location;

illuminating said calculated placement location with at least one of said first and second illuminating beams of light;

placing an ADAS sensor system calibration or alignment target at said illuminated placement location; and conducting a vehicle ADAS sensor system calibration or inspection utilizing said placed calibration or alignment target.

8. The method of claim 7 further including identifying the vehicle undergoing service; and recalling, from an accessible database, vehicle-specific instructions for placement of an ADAS sensor system calibration or alignment target relative to said selected origin point on said vehicle.

* * * * *